United States Patent
Ishii et al.

(10) Patent No.: US 7,827,178 B2
(45) Date of Patent: Nov. 2, 2010

(54) FILE SERVER FOR PERFORMING CACHE PREFETCHING IN COOPERATION WITH SEARCH AP

(75) Inventors: Yohsuke Ishii, Yokohama (JP); Etsutaro Akagawa, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 373 days.

(21) Appl. No.: 11/968,699

(22) Filed: Jan. 3, 2008

(65) Prior Publication Data

US 2008/0306917 A1     Dec. 11, 2008

(30) Foreign Application Priority Data

Jun. 8, 2007     (JP) .............................. 2007-152527

(51) Int. Cl.
    *G06F 17/30*     (2006.01)
(52) U.S. Cl. ...................................... 707/736
(58) Field of Classification Search ............... 707/3, 707/10, 203, 736

See application file for complete search history.

(56) References Cited

U.S. PATENT DOCUMENTS 7,587,398 B1 *   9/2009   Fredricksen et al. ................ 1/1

FOREIGN PATENT DOCUMENTS

JP     2006-085565     3/2006

* cited by examiner

*Primary Examiner*—Etienne P LeRoux
(74) *Attorney, Agent, or Firm*—Brundidge & Stanger, P.C.

(57) ABSTRACT

Provided is a control computer coupled to a storage apparatus for storing a plurality of information resources and a search computer for receiving a search request containing a search condition and transmitting information resource list information containing at least one piece of information regarding an information resource corresponding to the search condition as a search result, the control computer includes a cache memory for storing at least one of the plurality of information resources, in which the control computer is configured to: receive the information resource list information from the search computer; calculate cache priority for each of the information resources based on the received information resource list information; decide at least one information resource to be stored in the cache memory based on the calculated cache priority; and store the decided at least one information resource in the cache memory.

19 Claims, 12 Drawing Sheets

| CACHE FLAG | FILE PATH NAME | SIZE [Bytes] | NUMBER OF ACCUMULATED HIGH-RANK HITS | LAST HIGH-RANK HIT DATE |
|---|---|---|---|---|
| 1 | /usr/tmp | 4096 | 20 | 2007-01-10 12:00:00 |
| 1 | /usr/memo | 8192 | 10 | 2007-01-20 15:30:00 |
| 0 | /usr/hoge | 1024 | 10 | 2000-10-10 12:34:56 |
| 1 | /usr/foo | 1024 | 2 | 2007-01-20 12:00:00 |
| ... | ... | ... | ... | ... |

*FIG. 5*

FILE NAME OF HIGH-RANK HIT FILE
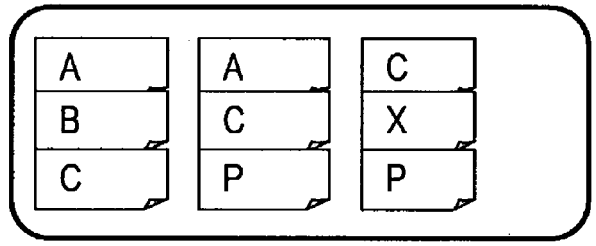
FIG. 8
LINE-UP LIST
| RANK. | NAME. | NUMBER OF ACCUMULATION TIMES | SIZE[B] |
|---|---|---|---|
| 1. | C. | 3. | 1000 |
| 2. | A. | 2. | 3000 |
| 2. | P. | 2. | 2000 |
| 3. | B. | 1. | 1000 |
| 3. | X. | 1. | 8000 |
FIG. 9
CACHE TARGET FILE
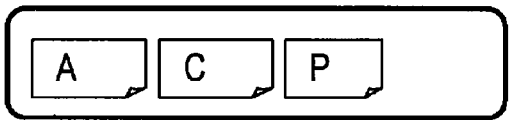
FIG. 10

FILE SERVER FOR PERFORMING CACHE PREFETCHING IN COOPERATION WITH SEARCH AP

CLAIM OF PRIORITY

The present application claims priority from Japanese patent application P2007-152527 filed on Jun. 8, 2007, the content of which is hereby incorporated by reference into this application.

BACKGROUND

This invention relates to a control computer connected to a storage apparatus and a search computer, and more particularly to a technology of controlling access to information resources.

Higher performance and a lower price of a computer system achieved in recent years now allow the computer system to be used for various purposes. Accordingly, the amount of information resources saved in the computer system has been significantly increasing. To increase availability of information resources stored in the computer system, an importance of a technology of improving access performance with respect to information resources has been increasing.

Recently, a technology of searching an information resource among a huge amount of information resources has been widely used. According to the search technology, a search server manages index information of the information resources stored in the computer system. A user designates search conditions such as a search keyword regarding information resources to be obtained. Then, a client machine transmits a search request containing the designated search conditions to the search server. Upon reception of the search request from the client machine, the search server creates a search result list with respect to the received search request based on the index information. The search server returns the created search result list to the client machine. The search result list contains identifiers of the searched information resources, access destination information and the like. The client machine receives the search result list. Then, the client machine accesses the information resources by using the access destination information contained in the received search result list.

A cache control technology of speeding-up access to the information resources has been known. According to the cache control technology, an information resource management server prefetches information resources identified by the identifiers contained in the search results list in a cache memory. Thus, a cache hit rate is increased. The cache hit rate indicates a probability that information resources requested to be accessed are stored in the cache memory.

For example, the cache control technology is disclosed in JP 2006-85565 A. According to the technology disclosed in JP 2006-85565 A, an information resource management server creates a predicted download list based on a search log and a download log. Then, the information resource management server updates information resources stored in the cache memory based on the created download list.

SUMMARY

According to the technology described in JP 2006-85565 A, all the information resources hit in search are prefetched in the cache memory. Thus, even information resources relatively low in relevance to search conditions are prefetched in the cache memory. In other words, even information resources less likely to be accessed are prefetched in the cache memory. As a result, a cache hit rate becomes low, thereby causing a problem in that average response time is extended.

It is an object of the invention to provide a technology capable of increasing a cache hit rate in view of the aforementioned problems.

According to an exemplary embodiment of this invention, there is provided a control computer coupled to a storage apparatus for storing a plurality of information resources and a search computer for receiving a search request containing a search condition and transmitting information resource list information containing at least one piece of information regarding at least one information resource corresponding to the search condition as a search result, the control computer comprising a cache memory for storing at least one of the plurality of information resources, wherein the control computer is configured to: receive the information resource list information from the search computer; calculate cache priority for each information resource based on the received information resource list information; decide at least one information resource to be stored in the cache memory based on the calculated cache priority; and store the decided at least one information resource in the cache memory.

According to the exemplary embodiment of this invention, the cache hit rate is improved.

BRIEF DESCRIPTION OF THE DRAWINGS

The present invention can be appreciated by the description which follows in conjunction with the following figures, wherein:

FIG. 5 is a diagram showing a configuration of a cache candidate management table stored in the file server according to the embodiment of this invention;

FIG. 8 is an explanatory diagram of a high-rank hit file according to the embodiment of this invention;

FIG. 9 is an explanatory diagram of a line-up list according to the embodiment of this invention;

FIG. 10 is an explanatory diagram of a cache target files according to the embodiment of this invention;

DETAILED DESCRIPTION OF THE PREFERRED EMBODIMENTS

Figure 1:
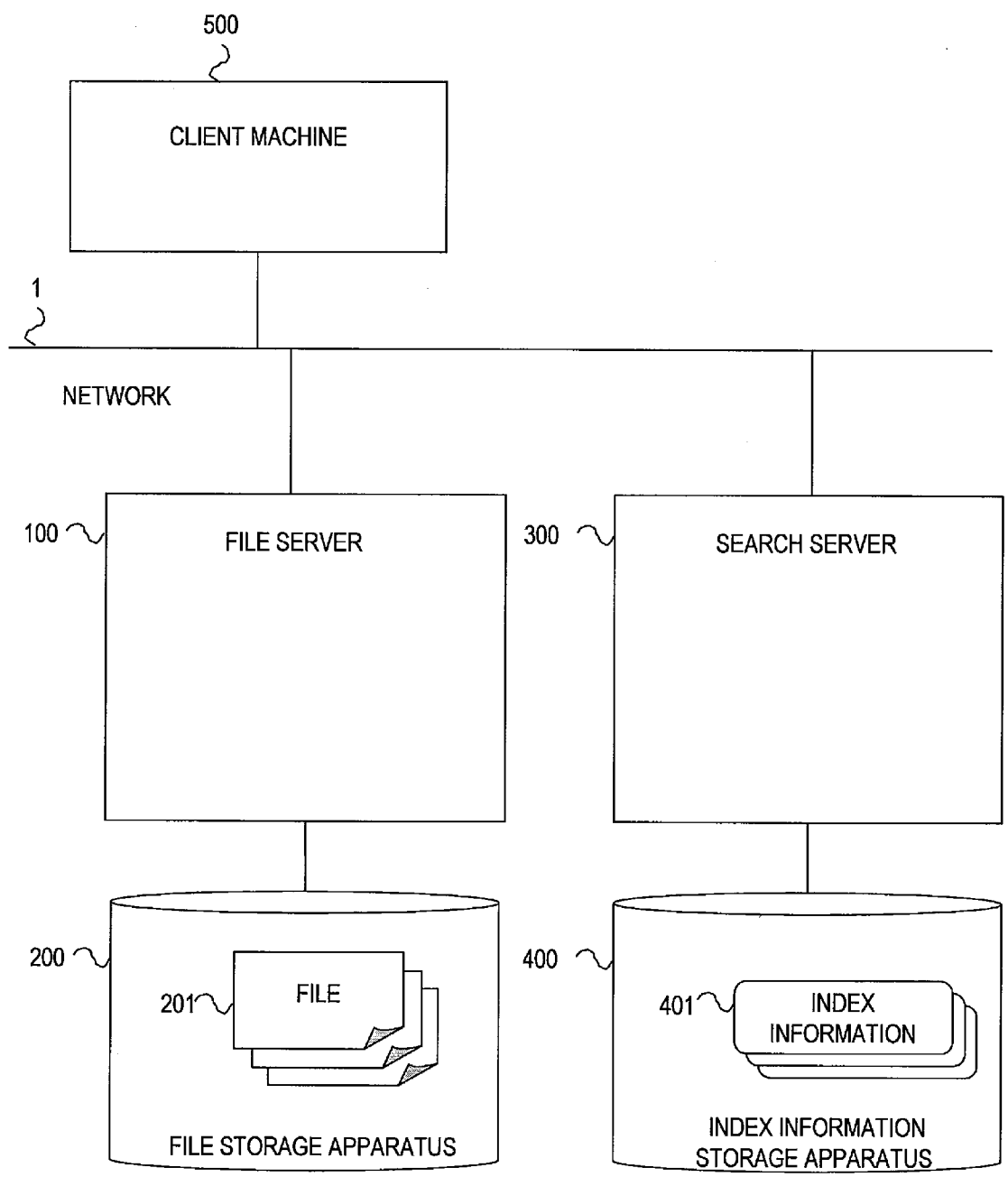
FIG. 1 is a block diagram showing a configuration of a computer system according to an embodiment of this invention.

FIG. 1 is a block diagram showing a configuration of a computer system according to an embodiment of this invention.

The computer system includes a network 1, a file server 100, a file storage apparatus 200, a search server 300, an index information storage apparatus 400, and a client machine 500.

The filer server 100, the file storage apparatus 200, the search server 300, the index information storage apparatus 400, and the client machine 500 are shown one by one. However, the plurality thereof may be disposed in the computer system.

The network 1 interconnects the file server 100, the search server 300, and the client machine 500. The file server 100 and the file storage apparatus 200 are interconnected. The search server 300 and the index information storage apparatus 400 are interconnected.

The file server 100 is a computer which provides file share services to the client machine 500. Accordingly, the file server 100 provides data stored in the file storage apparatus 200 as a file 201 which is one of information resources to the client machine 500. The file server 100 will be described below in detail referring to FIG. 2.

The file storage apparatus 200 is a storage apparatus which stores the file 201. For example, the file storage apparatus 200 is a storage apparatus which includes a disk drive and a disk controller. Any type of a file storage apparatus 200 may be used as long as it can store the file 201.

The search server 300 is a computer which provides search services to the client machine 500. The search server 300 will be described below in detail referring to FIG. 3.

The index information storage apparatus 400 is a storage apparatus which stores index information 401. For example, the index information storage apparatus 400 is a storage apparatus which includes a disk drive and a disk controller. Any type of an index information storage apparatus 400 may be used as long as it can store the index information 401.

The index information 401 is equivalent to meta data of the file 201 managed by the file server 100. Specifically, the index information 401 contains a file name which is an identifier of the file 201, a file path name indicating a storage place of the file 201, and information regarding a search keyword high in relevance to the file 201.

The client machine 500 is a computer which receives file share services and search services. The client machine 500 will be described below in detail referring to FIG. 4.

Figure 2:
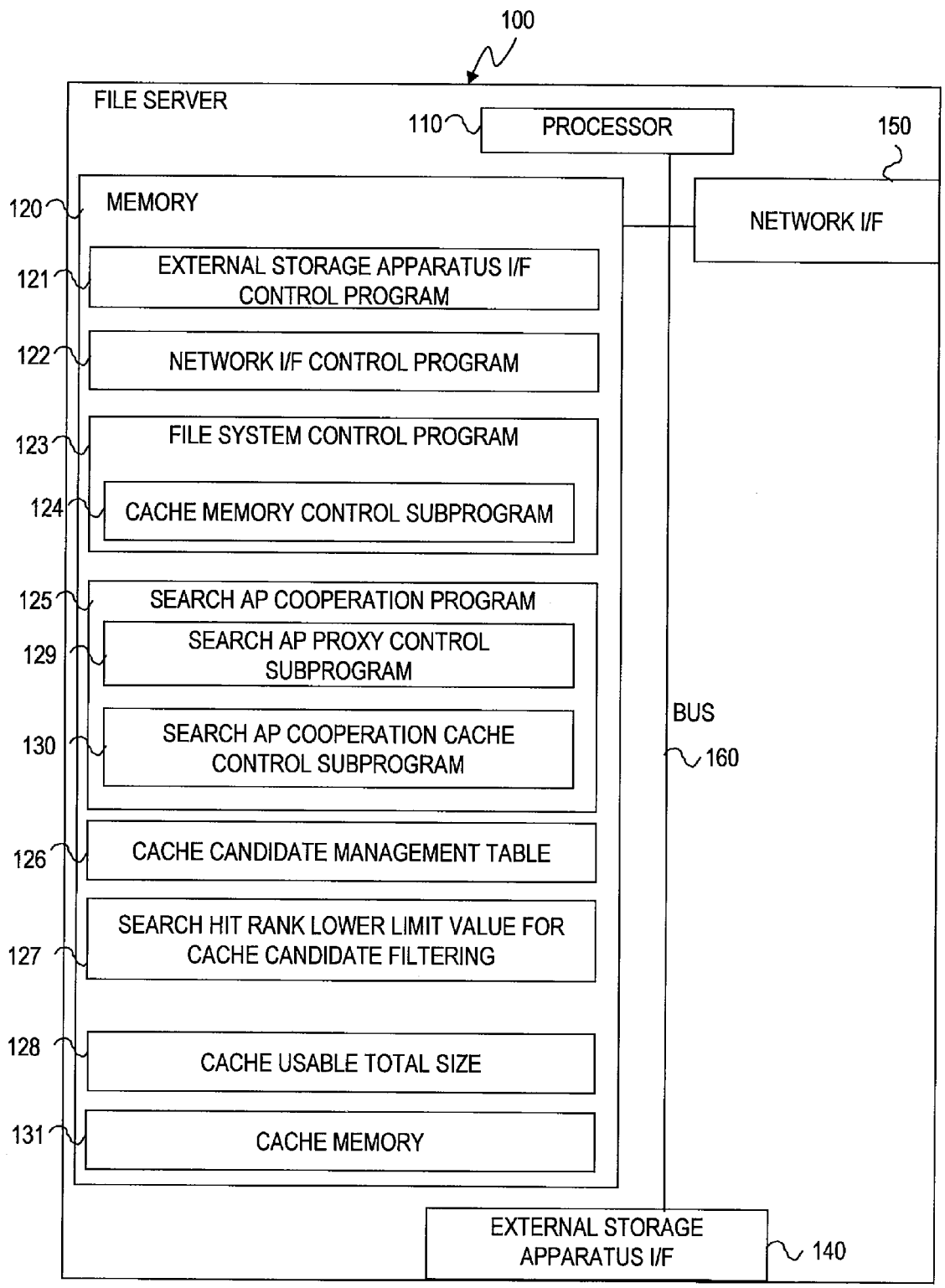
FIG. 2 is a block diagram showing a configuration of a file server disposed in the computer system according to the embodiment of this invention.

FIG. 2 is a block diagram showing a configuration of the file server 100 disposed in the computer system according to the embodiment of this invention.

The file server 100 includes a processor 110, a memory 120, an external storage apparatus interface (external storage apparatus I/F) 140, a network interface (network I/F) 150, and a bus 160.

The external storage apparatus I/F 140 is an interface connected to the file storage apparatus 200. The network I/F 150 is an interface connected to the search server 300 and the client machine 500 via a network 1. The bus 160 interconnects the processor 110, the memory 120, the external storage apparatus I/F 140, and the network I/F 150.

The processor 110 executes programs stored in the memory 120 to perform various processes.

The memory 120 stores the programs executed by the processor 110, and information needed by the processor 110. Specifically, the memory 120 stores an external storage apparatus I/F control program 121, a network I/F control program 122, a file system control program 123, a search AP cooperation program 125, a cache candidate management table 126, a cache candidate filtering search hit rank lower limit value 127, and a cache usable total size 128. A part of the memory 120 is used as a cache memory 131.

The cache memory 131 temporarily stores a part or all of files 201 managed by the file system control program 123. In other words, the files 201 are prefetched by the cache memory 131. Accordingly, response time with respect to access to the file 201 is shortened.

The external storage apparatus I/F control program 121 controls the external storage apparatus I/F 140. The network I/F control program 122 controls the network I/F 150.

The file system control program 123 controls the file system. In other words, the file system control program 123 manages the file 201 stored in the file storage apparatus 200. The file system control program 123 contains a cache memory control subprogram 124. The cache memory control subprogram 124 manages the cache memory 131.

The search AP cooperation program 125 cooperates with a search AP 324 disposed in the search server 300. The search AP cooperation program 125 contains a search AP proxy control subprogram 129 and a search AP cooperation cache control subprogram 130.

The search AP proxy control subprogram 129 receives a search request from the client machine 500, and transfers the received search request to the search AP 324 disposed in the search server 300. Then, the search AP proxy control subprogram 129 receives a search result list with respect to the transferred search request from the search AP 324 disposed in the search server 300. Then, the search AP proxy control subprogram 129 transfers the received search result list to a search request subprogram 526 disposed in the client machine 500.

When the search AP proxy control subprogram 129 receives the search result list, the search AP cooperation cache control subprogram 130 updates the cache candidate management table 126 based on the search result list received by the search AP proxy control subprogram 129. The search AP cooperation cache control subprogram 130 decides a cache target file based on the cache candidate management table 126.

The cache target file is a file 201 prefetched in the cache memory 131. Accordingly, the cache memory control subprogram 124 prefetches the cache target file decided by the search AP cooperation cache control subprogram 130 in the cache memory 131. On the other hand, the cache memory control subprogram 124 deletes files other than the cache target file decided by the search AP cooperation cache control subprogram 130 from the cache memory 131.

The cache candidate management table 126 manages cache candidate files. The cache candidate file is a file which becomes a candidate of a cache target file. The cache candidate management table 126 will be described below in detail referring to FIG. 5.

The cache candidate filtering search hit rank lower limit value 127 is a lower limit value of a rank for judging that the file 201 is a high-rank hit in the search result list. Accordingly, the cache candidate filtering search hit rank lower limit value 127 is an integer. Upon reception of an instruction of changing the cache candidate filtering search hit rank lower limit value 127, the search AP cooperation program 125 changes the cache candidate filtering search hit rank lower limit value 127.

The cache usable total size 128 indicates a capacity usable as a cache memory 131 among capacities of the memory 120. Accordingly, the cache usable total size 128 is used to decide the number of files to be prefetched in the cache memory 131. Upon reception of an instruction of changing the cache usable total size 128, the search AP cooperation program 125 changes the cache usable total size 128.

Figure 3:
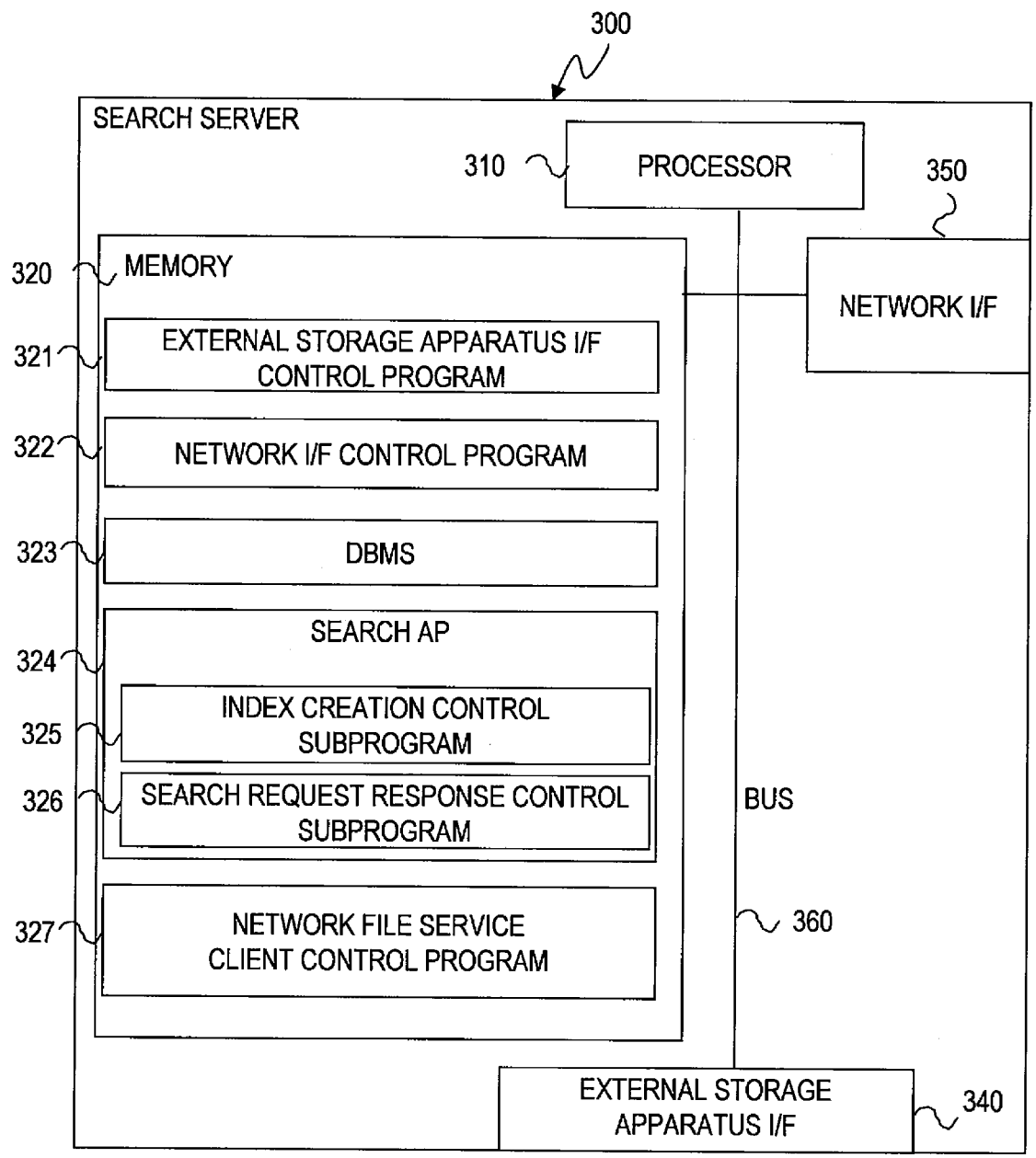
FIG. 3 is a block diagram showing a configuration of a search server disposed in the computer system according to the embodiment of this invention.

FIG. 3 is a block diagram showing a configuration of the search server 300 disposed in the computer system according to the embodiment of this invention.

The search server 300 includes a processor 310, a memory 320, an external storage apparatus interface (external storage apparatus I/F) 340, a network interface (network I/F) 350, and a bus 360.

The external storage apparatus I/F 340 is an interface connected to the index information storage apparatus 400. The network I/F 350 is an interface connected to the filer server 100 and the client machine 500 via the network 1. The bus 360 interconnects the processor 310, the memory 320, the external storage apparatus I/F 340, and the network I/F 350.

The processor 310 executes programs stored in the memory 320 to perform various processes.

The memory 320 stores the programs executed by the processor 310, and information needed by the processor 310. Specifically, the memory 320 stores an external storage apparatus I/F control program 321, a network I/F control program 322, a DBMS 323, a search application program (search AP) 324.

The external storage apparatus I/F control program 321 controls the external storage apparatus I/F 340. The network I/F control program 322 controls the network I/F 350.

The DBMS 323 is a program for managing the index information 401. The index information 410 may be managed by other than the DBMS 323.

The search AP 324 performs various processes regarding search. The search AP 324 contains an index creation control subprogram 325 and a search request response control subprogram 326.

The index creation control subprogram 325 generates index information 401 of the file 201.

The search request response control subprogram 326 receives a search request. The search request response control subprogram 326 executes search based on the index information 401 according to the received search request to create a search result list. The search request response control subprogram 326 returns the created search result list to a transmission source of the search request.

The network file service client control program 327 obtains information of the file 201 which becomes a search target from the file system control program 123 disposed in the file server 100.

Figure 4:
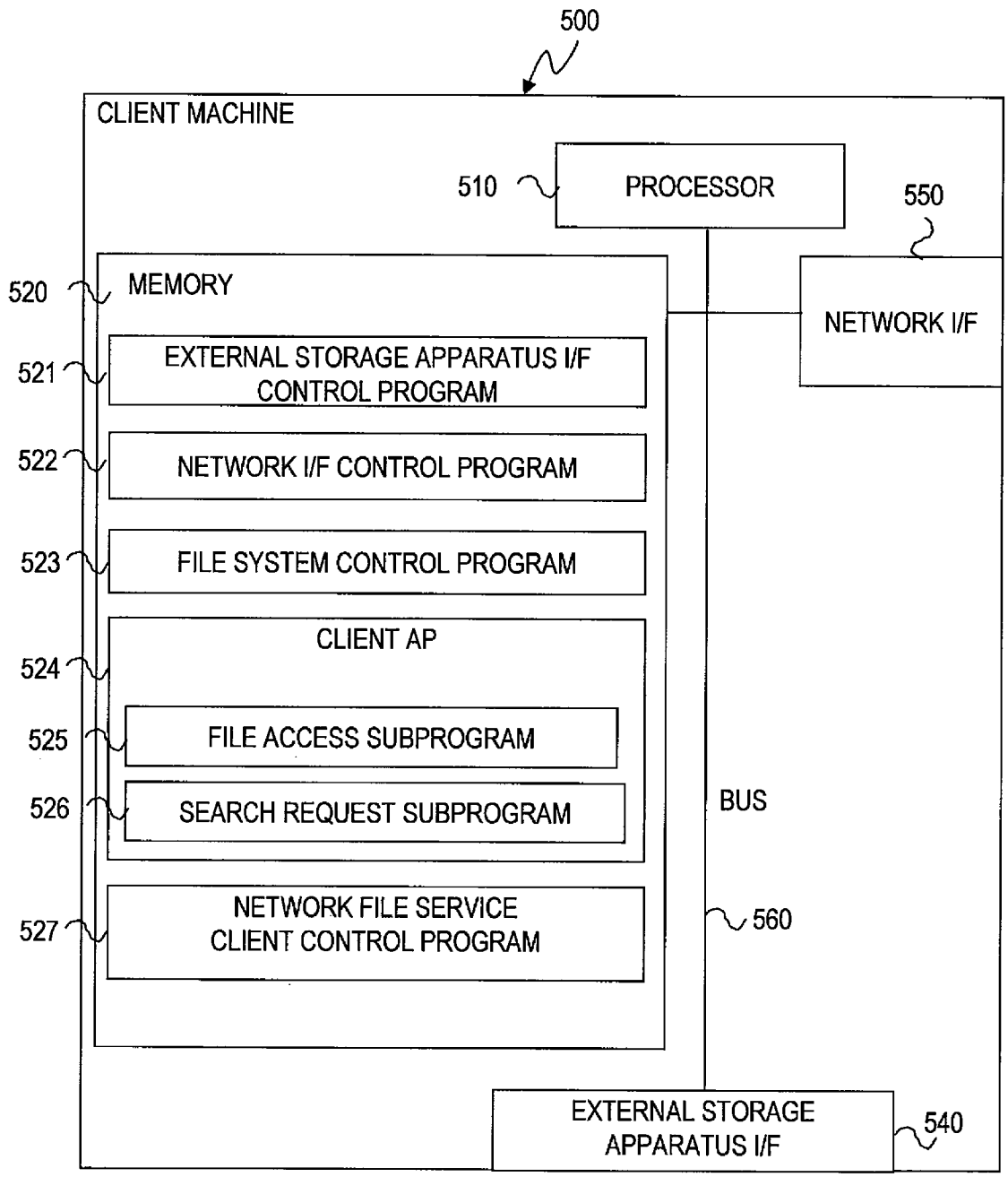
FIG. 4 is a block diagram showing a configuration of a client machine disposed in the computer system according to the embodiment of this invention.

FIG. 4 is a block diagram showing a configuration of the client machine 500 disposed in the computer system according to the embodiment of this invention.

The client machine 500 includes a processor 510, a memory 520, an external storage apparatus interface (external storage apparatus I/F) 540, a network interface (network I/F) 550, and a bus 560.

The external storage apparatus I/F 540 is an interface connected to an external storage apparatus (not shown). The external storage apparatus stores various pieces of information containing programs. The network I/F 550 is an interface connected to the filer server 100 and the search server 300 via the network 1. The bus 560 interconnects the processor 510, the memory 520, the external storage apparatus I/F 540, and the network I/F 550.

The processor 510 executes programs stored in the memory 520 to perform various processes.

The memory 520 stores the programs executed by the processor 510, and information needed by the processor 510. Specifically, the memory 520 stores an external storage apparatus I/F control program 521, a network I/F control program 522, a file system control program 523, a client application program (client AP) 524 and a network file service client control program 527.

The external storage apparatus I/F control program 521 controls the external storage apparatus I/F 540. The network I/F control program 522 controls the network I/F 550.

The file system control program 523 executes a process for controlling the file system.

The client AP 524 accesses the file server 100 and the search server 300. The client AP 524 contains a file access subprogram 525 and a search request subprogram.

The file access subprogram 525 accesses the file system control program 123 installed in the file server 100.

The search request subprogram 526 accesses the search AP 324 installed in the search server 300 via the search AP proxy control subprogram 129 disposed in the file server 100.

Specifically, the search request subprogram 526 transmits a search request not to the search AP 234 disposed in the search server 300 but to the search AP proxy control subprogram 129 disposed in the file server 100. The search AP proxy control subprogram 129 disposed in the file server 100 transmits the received search request to the search AP 324 disposed in the search server 300. Then, the search AP proxy control subprogram 129 receives a search result list with respect to the transferred search request from the search AP 324 disposed in the search server 300. The search AP proxy control subprogram 129 transfers the received search result list to the search request subprogram 526 disposed in the client machine 500. The search request subprogram 526 receives the search result list, and outputs the received search result list.

The network file service client control program 527 executes a process of accessing the file system control program 123 disposed in the file server 100.

FIG. 5 is a diagram showing a configuration of the cache candidate management table 126 stored in the file server 100 according to the embodiment of this invention.

The cache candidate management table 126 includes a cache flag 1261, a file path name 1262, a size 1263, a number of accumulated high-rank hits 1264, and a high-rank hit last date 1265.

The file path name 1262 indicates a position where a file managed by the file server 100 is stored.

The cache flag 1261 indicates whether a file stored in a position corresponding to the file path name 1262 of the record has been prefetched in the cache memory 131. For example, when the file has been prefetched in the cache memory 131, the cache flag 1261 indicates "1". On the other hand, when the file has not been prefetched in the cache memory 131, the cache flag 1261 indicates "0".

The size 1263 indicates a size of the file stored in the position corresponding to the file path name 1262 of the record.

The number of accumulated high-rank hits 1264 indicates how many times files stored in the position corresponding to the file path name 1262 of the record are judged as a high-rank hit. Specifically, the number of accumulated high-rank hits

1264 represents how many times the files stored in the position corresponding to the file path name 1262 of the record have been hit with the rank within the cache candidate filtering search hit rank lower limit value 127.

The high-rank hit last date 1265 is a last date when the file stored in the position corresponding to the file path name 1262 of the record is judged as a high-rank hit. Specifically, the high-rank hit last date 1265 is a last date when the files stored in the position corresponding to the file path name 1262 of the record are hit with the rank within the cache candidate filtering search hit rank lower limit value 127.

Next, referring to FIGS. 6 to 10, an outline of a process of prefetching the file in the cache memory 131 by the file server 100 according to the embodiment of this invention will be given.

The processor 110 of the file server 100 receives a search request containing a search keyword from the client machine 500, and transfers the received search request to the search server 300. Then, the processor 110 of the file server 100 receives a search result list shown in FIG. 6 from the search server 300. The processor 110 of the file server 100 transfers the received search result list to the client machine 500.

Figure 6:
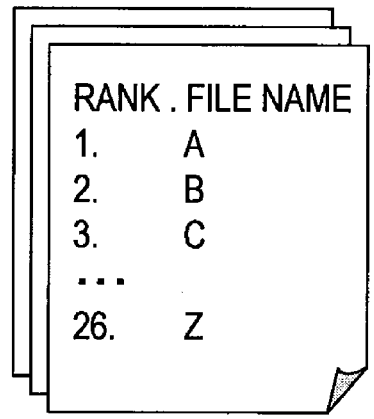
FIG. 6 is an explanatory diagram of a search result list according to the embodiment of this invention.

FIG. 6 is an explanatory diagram of the search result list according to the embodiment of this invention.

The search result list contains a file name. The file name is an identifier of a file regarding a search keyword contained in the search request. In the search result list, ranks (search hit ranks) are added to files based on heights of relevance to the search keyword contained in the search request. In the search result list, any method may be employed to add search hit ranks to the files.

The search result list may contain any type of information regarding the files relevant to the search keyword contained in the search request. For example, the search result list may contain a file path name indicating a position in which the file regarding the search keyword contained in the search request is stored.

The processor 110 of the filer server 100 decides a cache target file based on the received search result list. A case where the processor 110 of the file server 100 decides a cache target file based on received three searched result lists will be described.

Figure 7:
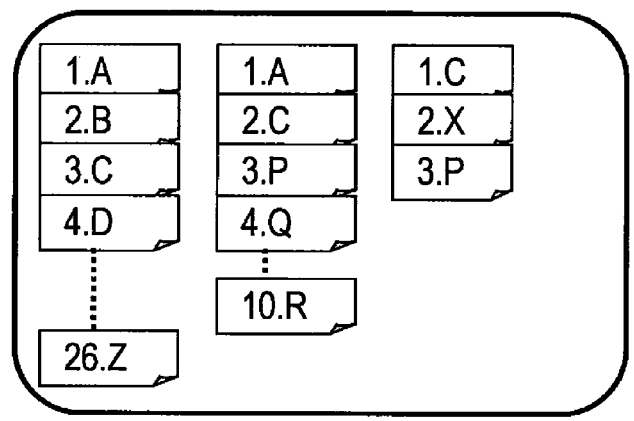
FIG. 7 is an explanatory diagram of a file name included in the search result list according to the embodiment of this invention.

FIG. 7 is an explanatory diagram of a file name included in the search result list according to the embodiment of this invention.

The explanatory diagram shows file names included in each search result list in search hit rank. As shown in the explanatory diagram, a first search result list includes 26 file names. A second search result list includes 10 file names. A third search result list includes 3 file names.

The processor 110 of the file server 100 extracts names of files to which ranks within the cache candidate filtering search hit rank lower limit value 127 have been added from the three search result lists.

It is presumed that the cache candidate filtering search hit rank lower limit value 127 is "3". In this case, the processor 110 of the file server 100 extracts names of files to which first to third ranks have been added from each of the three search result lists. The processor 110 of the file server 100 judges that files identified by the extracted file names are high-rank hit files.

FIG. 8 is an explanatory diagram of a high-rank hit file according to the embodiment of this invention.

The explanatory diagram shows names of files (high-rank hit files) judged to be high-rank hit files by the processor 110 of the file server 100. In other words, the explanatory diagram shows names of files to which first to third ranks have been added in the search result lists.

Then, the processor 110 of the file server 100 updates the cache candidate management table 126 based on information regarding the files identified by the extracted file names.

The processor 110 of the file server 100 creates a line-up list as shown in FIG. 9 based on the cache candidate management table 126.

FIG. 9 is an explanatory diagram of the line-up list according to the embodiment of this invention.

The line-up list includes names of files stored in positions corresponding to the file path name 1262 of the cache candidate management table 126. The line-up list may include various pieces of information regarding each of the files. For example, the line-up list includes the number of accumulated high-rank hitting times of each of the files and a size thereof.

In the line-up list, the file names are arrayed in a descending order from a file having a higher cache priority. The cache priority is a value for deciding which file is prefetched in the cache memory 131. The file server 100 calculates the cache priority based on at least one of the number of accumulated high-rank hitting times 1264 and a high-rank hit last date 1265 of the cache candidate management table 126. The file server 100 prefetches files in a descending order from a file having a higher calculated cache priority in the cache memory 131.

A case where the cache priority corresponds to the number of accumulated high-rank hitting times will be described. In this case, in the line-up list, file names are arrayed in a descending order from a file having a larger number of accumulated high-rank hitting times. Because the number "3" of accumulated high-rank hitting times of a file C is largest, "C" is stored in a highest-rank file name of the line-up list. Similarly, in the line-up list of the explanatory diagram, file names are arrayed in the order of "C", "A", "P", "B", and "X".

Then, the processor 110 of the file server 100 selects the file names included in the created line-up list one by one in a descending order from a higher-rank file. The processor 110 of the file server 100 adds sizes of the files identified by the selected file names in order. In this case, the processor 110 of the file server 100 adds the sizes of the files until just before the total value exceeds the cache usable total size 128.

A case where the cache usable total size 128 is "6000 bytes" will be described. In this case, the processor 110 of the file server 100 adds the size of the file identified by the file name "C", the size of the file identified by the file name "A", and the size of the file identified by the file name "P" to calculate a total value "6000 bytes". The calculated total value matches with the cache usable total size 128. Thus, whichever of a size of a file identified by a file name "B" or a size of a file identified by a file name "X" is added to the calculated total value, the total value exceeds the cache usable total size 128.

Thus, the processor 110 of the file server 100 decides the files respectively identified by the file names "C", "A", and "P" to be cache target files.

FIG. 10 is an explanatory diagram of the cache target files according to the embodiment of this invention.

The cache target files are files 201 prefetched in the cache memory 131. In this case, the processor 110 of the file server 100 prefetches the files respectively identified by the file names "C", "A", and "P" in the cache memory 131.

Next, the process of the file server 100 according to the embodiment of this invention will be described in detail.

Figure 11:
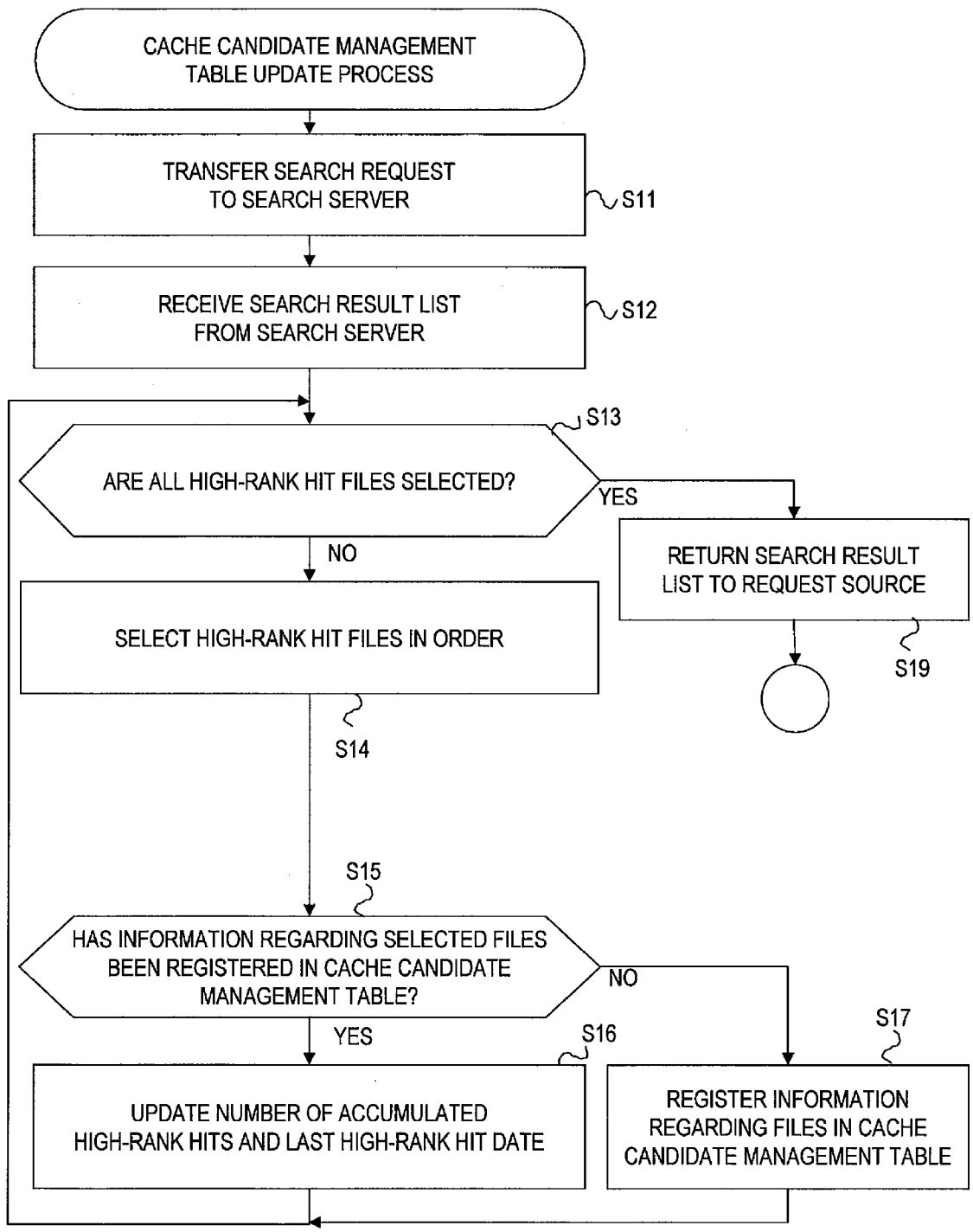
FIG. 11 is a flowchart of a cache candidate management table update process executed by the file server according to the embodiment of this invention.

FIG. 11 is a flowchart of a cache candidate management table update process executed by the file server 100 according to the embodiment of this invention.

Upon reception of a search request containing a search keyword from the client machine 500, the processor 110 of the file server 100 executes the cache candidate management table update process.

First, the processor 110 of the file server 100 transfers the received search request to the search server 300 (S11).

The processor 310 of the search server 300 receives the search request from the file server 100. Then, the processor 310 of the search server 300 searches index information 401. Accordingly, the processor 310 of the search server 300 creates a search result list which satisfies conditions of the received search request. A method of creating the search result list by the processor 310 of the search server 300 is similar to the conventional method, and any method can be used. The search result list includes a list of file names of files high in relevance to the search keyword contained in the search request. In the search result list, ranks (search hit ranks) are added to the files based on height of relevance to the search keyword contained in the search request. In the search result list, file names are arrayed in an order of search hit.

Then, the processor 310 of the search server 300 transmits the created search result list to the file server 100.

The processor 110 of the file server 100 receives the search result list from the search server 300 (S12).

The processor 110 of the file server 100 extracts file names of files (high-rank hit files) to which ranks within the cache candidate filtering search hit rank lower limit value 127 have been added from the received search result list.

The processor 110 of the file server 100 judges whether all the extracted file names of the high-rank hit files have been selected in a step S14 (S13).

If all the file names of the high-rank hit files have been selected, the processor 110 of the file server 100 transfers the search result list received in the step S12 to the client machine 500 of the transmission source of the search request received in the step S11 (S19). Then, the processor 110 of the file server 100 finishes the cache candidate management table update process.

On the other hand, if any one of the file names of the high-rank hit files has not been selected, the processor 110 of the file server 100 selects one unselected file name among the extracted file names of the high-rank hit files (S14). In other words, the processor 110 of the file server 100 selects all the extracted file names of the high-rank hit files one by one in order.

The processor 110 of the file server 100 judges whether information regarding the files identified by the selected file names has been stored in the cache candidate management table 126 (S15).

If the information regarding the files has been stored in the cache candidate management table 126, the processor 110 of the file server 100 selects records regarding the files identified by the selected file names from the cache candidate management table 126. The processor 110 of the file server 100 adds "1" to the number of accumulated high-rank hitting times 1264 of the selected records. The processor 110 of the file server 100 stores current time in the high-rank hit last date 1265 of the selected records (S16).

Then, the processor 110 of the file server 100 returns to the step S13 to repeat the process.

On the other hand, if the information regarding the files has not been stored in the cache candidate management table 126, the processor 110 of the file server 100 creates a new record in the cache candidate management table 126. The processor 110 of the file server 100 stores the information regarding the files identified by the selected file names in the new record.

Specifically, the processor 110 of the file server 100 stores "0" in a cache flag 1261 of the new record. The processor 110 of the file server 100 stores file path names indicating storing positions of the files identified by the selected file names in a file path name 1262 of the new record. The processor 110 of the file server 100 stores "1" in the number of accumulated high-rank hitting times 1264 of the new record. The processor 110 of the file server 100 stores current time in a high-rank hit last date 1265 of the new record (S17).

Then, the processor 110 of the file server 100 returns to the step S13 to repeat the process.

In the step S13, the processor 110 of the file server 100 may extract not the file names of the high-rank hit files but the file path names of the high-rank hit files. In this case, the processor 110 of the file server 100 selects all the extracted file path names of the high-rank hit files one by one in order.

The processor 110 of the file server 100 judges whether records where the selected file path names mach the file path names 1262 of the cache candidate management table 126 are present in the cache candidate management table 126. In other words, the processor 110 of the file server 100 judges whether information regarding files stored in positions corresponding to the selected file path names has been stored in the cache candidate management table 126 (S15).

If information regarding the file has been stored in the cache candidate management table 126, the processor 110 of the file server 100 selects a record where a selected file path name matches the file path name 1262 of the cache candidate management table 126 from the cache candidate management table 126. The processor 110 of the file server 100 adds "1" to the number of accumulated high-rank hitting times 1264 of the selected record. The processor 110 of the file server 100 stores current time in a high-rank hit last date 1265 of the selected record (S16).

Then, the processor 110 of the file server 100 returns to the step S13 to repeat the process.

On the other hand, if information regarding the file has not been stored in the cache candidate management table 126, the processor 110 of the file server 100 creates a new record in the cache candidate management table 126. The processor 110 of the file server 100 stores information regarding the file stored in a position corresponding to the selected file path name in the new record.

Specifically, the processor 110 of the file server 100 stores "0" in the cache flag 1261 of the new record. The processor 110 of the file server 100 stores the selected file path name in the file path name 1262 of the new record. The processor 110 of the file server 100 stores "1" in the number of accumulated high-rank hitting times 1264 of the new record. The processor 110 of the file server 100 stores current time in the high-rank hit last date 1265 of the new record (S17).

Then, the processor 110 of the file server 100 returns to the step S13 to repeat the process.

Figure 12:
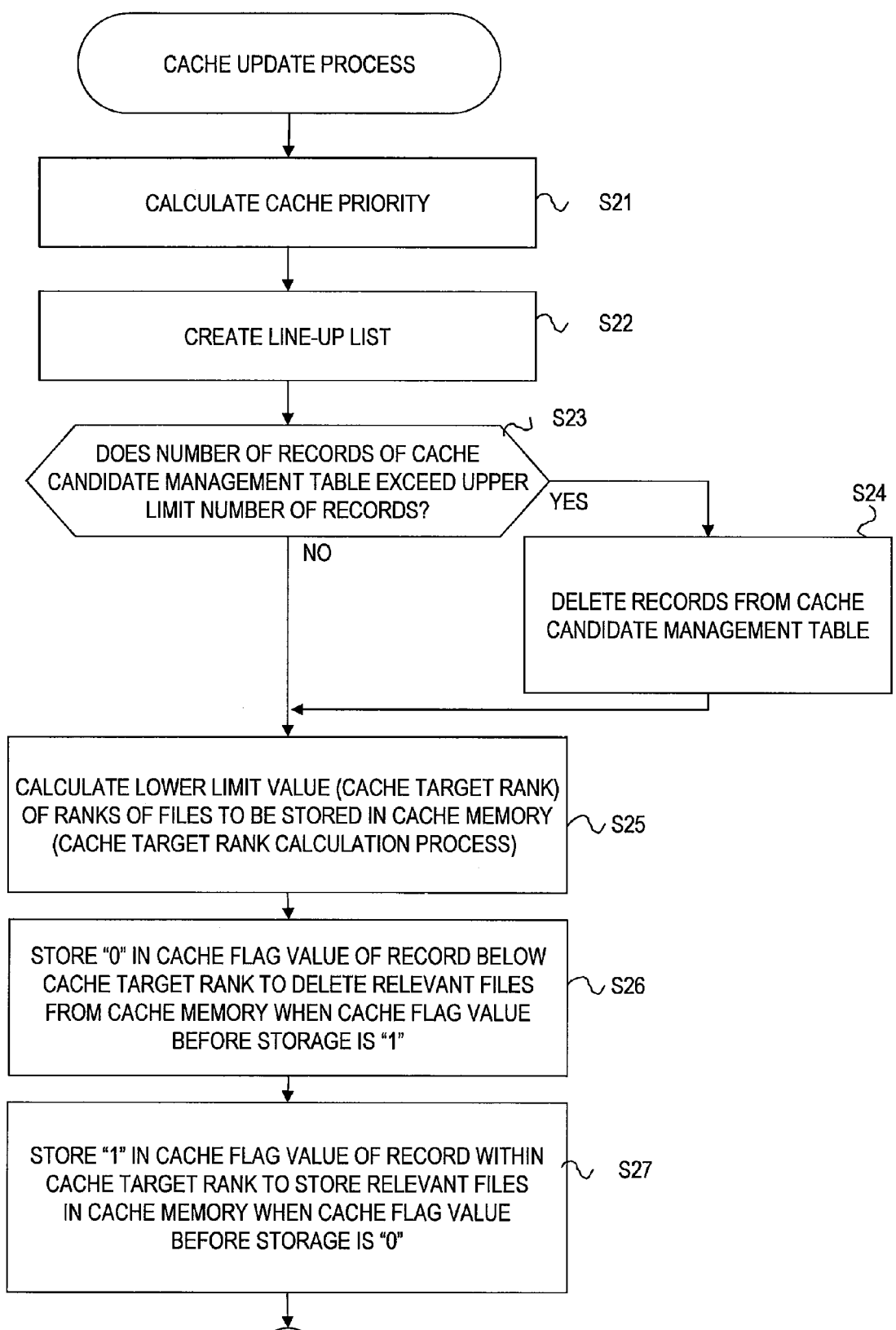
FIG. 12 is a flowchart showing a cache update process executed by the file server according to the embodiment of this invention.

FIG. 12 is a flowchart showing a cache update process executed by the file server 100 according to the embodiment of this invention.

The processor 110 of the file server 100 executes the cache update process at a predetermined cycle.

First, the processor 110 of the file server 100 calculates cache priority for each record of the cache candidate management table 126 (S21). In other words, the processor 110 of the file server 100 calculates cache priority for each file. The cache priority is a value for deciding which of files is prefetched in the cache memory 131. According to the embodiment, the processor 110 of the file server 100 calculates cache priority based on the cache candidate management table 126. However, any method may be employed to calculate cache priority.

Specifically, the processor 110 of the file server 100 calculates cache priority based on at least one of the number of accumulated high-rank hitting times 1264 and the high-rank hit last date 1265 of the cache candidate management table 126. Three methods of calculating cache priority will be described.

According to a first method, the number of accumulated high-rank hitting times 1264 of the cache candidate management table 126 is used. The processor 110 of the file server 100 sets higher cache priority as the number of accumulated high-rank hitting times 1264 of the cache candidate management table 126 is larger. In this case, the processor 110 of the file server 100 can preferentially prefetch files of large numbers of accumulated high-rank hitting times 1264 in the cache memory 131.

According to a second method, the high-rank hit last date 1265 of the cache candidate management table 126 is used. The processor 110 of the file server 100 sets higher cache priority as a passed time from the high-rank hit last date 1265 of the cache candidate management table 126 to current time is shorter. In this case, the processor 110 of the file server 100 can preferentially prefetch files of the latest high-rank hit in the cache memory 131.

According to a third method, the number of accumulated high-rank hitting times 1264 and the high-rank hit last date 1265 of the cache candidate management table 126 are used. The processor 110 of the file server 100 sets higher cache priority as the number of accumulated high-rank hitting times 1264 of the cache candidate management table 126 is larger. The processor 110 of the file server 100 sets higher cache priority as the passed time from the high-rank hit last date 1265 of the cache candidate management table 126 to current time is shorter. For example, the processor 110 of the file server 100 calculates cache priority P by using Equation 1.

$$P=f(A)/g(B) \qquad \text{Equation 1}$$

In the equation, A indicates the number of accumulated high-rank hitting times 1264, and B indicates a passage of time from the high-rank hit last date 1265 to the present time. Any functions may be used for f(A) and g(B).

Then, the processor 110 of the file server 100 creates a line-up list (S22). The line-up list is created by rearraying records of the cache candidate management table 126 in a descending order from a higher calculated cache priority. Accordingly, an order of the records of the line-up list corresponds to an order of calculated cache priorities.

An arraying order of records equal in cache priority can be optionally set. For example, when the cache candidate management table 126 includes a plurality of records having an identical cache priority, records are rearrayed in a descending order from a smaller size 1263 of the cache candidate management table 126. When the cache candidate management table 126 includes records having an identical cache priority, records are rearrayed in an order of dictionaries of file names.

Then, the processor 110 of the file server 100 judges whether the number of records in the cache candidate management table 126 is larger than the upper limit number of records (S23). The upper limit number of records is a predetermined value. For example, the upper limit number of records corresponds to the number of records which the processor 110 of the file server 100 can actually manage or the number of records which the processor 110 of the file server 100 can rearray within predetermined time.

If the number of records in the cache candidate management table 126 is equal to or less than the upper limit number of records, the processor 110 of the file server 100 directly proceeds to step S25.

On the other hand, if the number of records in the cache candidate management table 126 is larger than the upper limit number of records, the processor 110 of the file server 100 subtracts the number of records in the cache candidate management table 126 from the upper limit number of records. Accordingly, the processor 110 of the file server 100 calculates the excessive number of records. The processor 110 of the file server 100 selects records of the created line-up list in an ascending order by an amount equal to the calculated excessive number of records. In other words, the processor 110 of the file server 100 selects the records of the created line-up list in an ascending order from a lower cache priority by an amount equal to the calculated excessive number of records.

The processor 110 of the file server 100 deletes records corresponding to the records selected from the line-up list from the cache candidate management table 126 (S24). Accordingly, the processor 110 of the file server 100 reduces the records of the cache candidate management table 126 to the upper limit number of records. Thus, the amount of the memory 120 consumed by the cache candidate management table 126 can be suppressed.

The processor 110 of the file server 100 executes a cache target rank calculation process (S25). Accordingly, the processor 110 of the file server 100 calculates a lower limit value (cache target rank) of ranks of files prefetched in the cache memory 131. The cache target rank calculation process will be described below in detail referring to FIG. 13.

The processor 110 of the file server 100 selects all records equal to or less than the calculated cache target rank from the line-up list. The processor 110 of the file server 100 selects records corresponding to the records selected from the line-up list from the cache candidate management table 126.

The processor 110 of the file server 100 judges which of "0" and "1" has been stored in cache flags 1261 of the selected records.

If "0" has been stored in the cache flags 1261, the processor 110 of the file server 100 directly proceeds to step S26.

On the other hand, if "1" has been stored in the cache flags 1261, the processor 110 of the file server 100 stores "0" in the cache flags 1261 of the selected records. The processor 110 of the file server 100 deletes files stored in positions corresponding to the file path names 1262 of the selected records from the cache memory 131 (S26).

The processor 110 of the file server 100 selects all records within the calculated cache target rank from the line-up list. The processor 110 of the file server 100 selects records corresponding to the records selected from the line-up list from the cache candidate management table 126.

The processor 110 of the file server 100 judges which of "0" and "1" has been stored in cache flags of the selected records.

If "1" has been stored in the cache flag 1261, the processor 110 of the file server 100 directly finishes the cache update process.

On the other hand, if "0" has been stored in the cash flags 1261, the processor 110 of the file server 100 stores "1" in the cache flags 1261 of the selected records. The processor 110 of the file server 100 secures cache areas of sizes 1263 of the selected records in the cache memory 131. The processor 110 of the file server 100 prefetches files stored in positions corresponding to file path names 1262 of the selected records in the secured cache areas (S27). Then, the processor 110 of the file server 100 finishes the cache update process.

Figure 13:
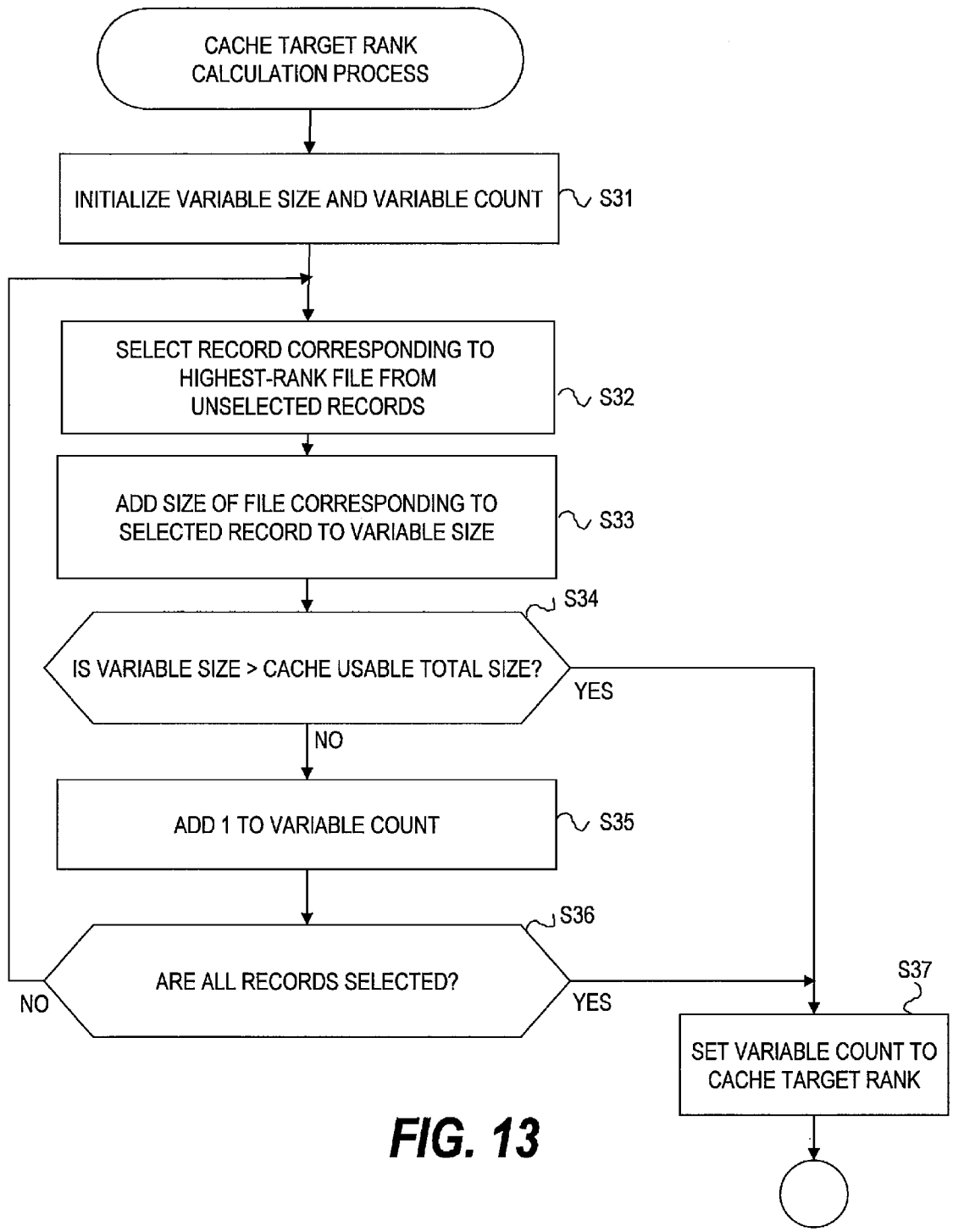
FIG. 13 is a flowchart of a cache target rank calculation process executed by the file server according to the embodiment of this invention.

FIG. 13 is a flowchart of the cache target rank calculation process executed by the file server 100 according to the embodiment of this invention.

The cache target rank calculation process is executed in the step S25 of the cache update process shown in FIG. 12.

First, the processor 110 of the file server 100 initializes variables size and count by 0 (S31). The processor 110 of the file server 100 selects records not selected in the step S32 from the line-up list. The processor 110 of the file server 100 selects a highest-rank record from the selected records (S32).

The processor 110 of the file server 100 adds a size of the selected record to the variable size (S33). The processor 110 of the file server 100 judges whether the variable size after the addition is larger than a cache usable total size 128 (S34).

If the variable size is larger than the cache usable total size 128, the processor 110 of the file server 100 sets the variable count to a cache target rank (S37). Then, the processor 110 of the file server 100 finishes the cache target rank calculation process.

On the other hand, if the variable size is equal to or less than the cache usable total size 128, the processor 110 of the file server 100 adds "1" to the variable count (S35).

Then, the processor 110 of the file server 100 judges whether all the records included in the line-up list have been selected in the step S32.

If any one of the records included in the line-up list has not been selected, the processor 110 of the file server 100 returns to the step S32 to repeat the process.

On the other hand, if all the records included in the line-up list have been selected, the processor 110 of the file server 100 sets the variable count to a cache target rank (S37). Then, the processor 110 of the file server 100 finishes the cache target rank calculation process.

According to the embodiment, the file server 100 prefetches the information resources in the cache memory 131 by file units. However, the information resources may be prefetched in the cache memory 131 by units or types other than files. For example, the information resources may be prefetched in the cache memory 131 by directory units, file system units, fixed block units, or volume units.

According to the embodiment, the file server 100 prefetches files in the cache memory 131 based on the search result list of the search server 300. In other words, the file server 100 specifies files highly likely to be accessed based on the search result list. Specifically, the file server 100 specifies files highly likely to be accessed based on the searched number of accumulated times and a passed time from the last search. The file server 100 prefetches the files highly likely to be accessed in the cache memory 131. Thus, a cache hit rate is increased, so average response time of the entire computer system can be shortened.

The file server 100 decides files to be prefetched based not on a specified search result list but on all the search result lists. Accordingly, even when a number of search requests are issued from a plurality of client machines 500, the file server 100 can prefetch the files highly likely to be accessed in the entire computer system in the cache memory 131.

The embodiment of this invention has been described. However, the invention is not limited to the embodiment. Various changes and modifications can be made on the configuration without departing from the spirit and scope of the invention.

Next, a modified example of the embodiment will be described.

According to the embodiment, the client machine 500 transmits the search request to the search server 300 via the file server 100. On the other hand, according to the modified example of the embodiment, a client machine 500 directly transmits a search request to a search server 300.

Figure 14:
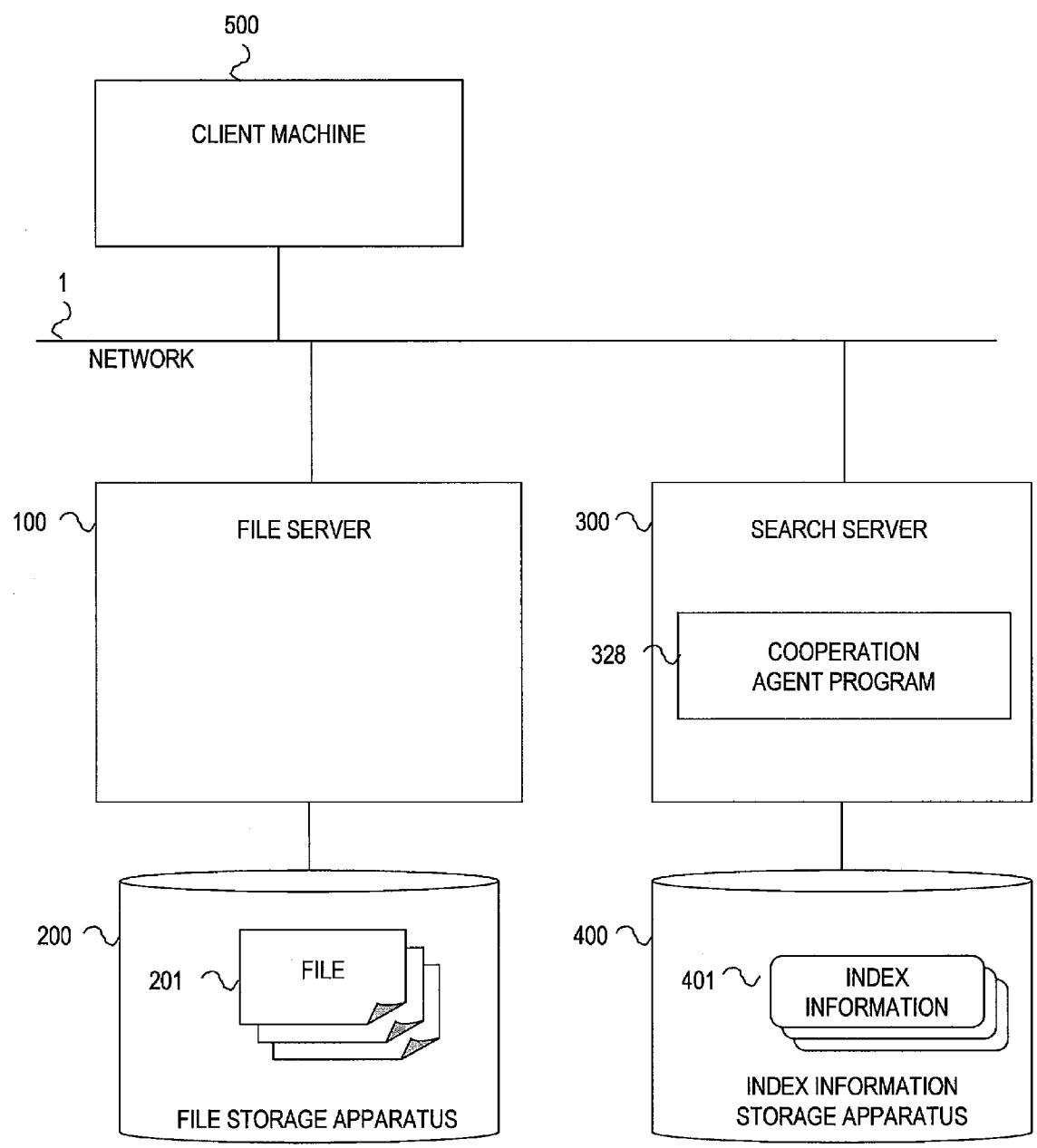
FIG. 14 is a block diagram showing a configuration of a computer system according to the modified example of the embodiment of this invention.

FIG. 14 is a block diagram showing a configuration of a computer system according to the modified example of the embodiment of this invention.

According to the modified example of the embodiment, a cooperation agent program 328 is stored in a memory 320 of the search server 300. Other configurations of the computer system of the modified example of the embodiment are similar to those of the computer system of the embodiment shown in FIG. 1. Similar components are denoted by similar reference numerals, and description thereof will be omitted.

The cooperation agent program 328 obtains a search result list transmitted from a search AP 324 to the client machine 500. The cooperation agent program 328 transmits the obtained search result list to a file server 100.

In this case, the file server 100 does not have to receive any search request from the client machine 500. Accordingly, the client machine 500 transmits the search request not to the file server 100 but to the search server 300 as usual. Thus, setting change operations in the client machine 500 can be reduced.

Processes of the computer system of the modified example of the embodiment are similar to those of the computer system of the embodiment shown in FIGS. 12 and 13 except for a cache candidate management table update process. Description of similar processes will be omitted.

Figure 15:
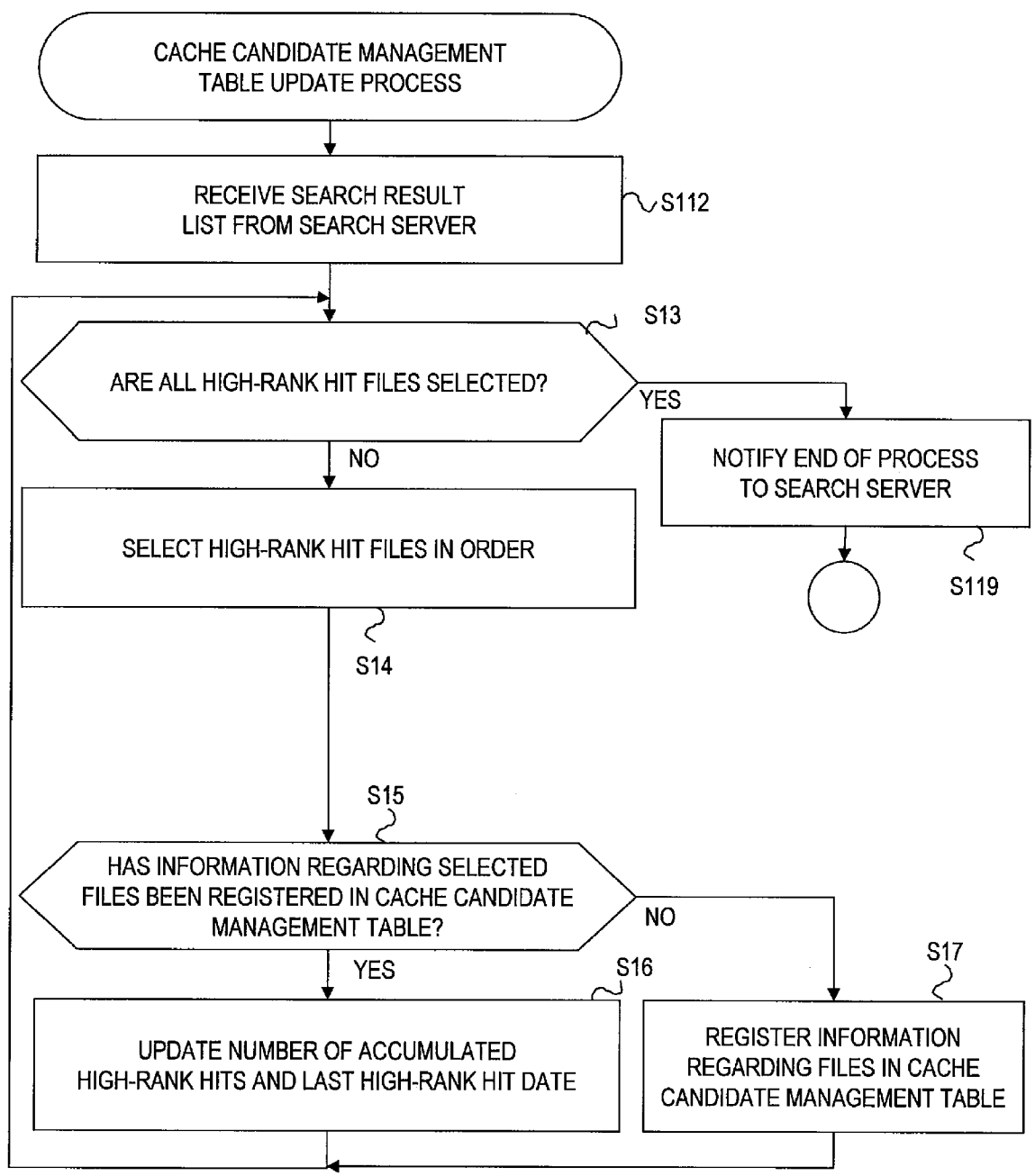
FIG. 15 is a flowchart of a cache candidate management table update process executed by the file server according to the modified example of the embodiment of this invention.

FIG. 15 is a flowchart of a cache candidate management table update process executed by the file server 100 according to the modified example of the embodiment of this invention.

Upon reception of a search result list from the search server 300 (S112), the processor 110 of the file server 100 executes the cache candidate management table update process.

The processor 110 of the file server 100 executes steps S13 to S17. The steps S13 to S17 are similar to those of the cache candidate management table update process of the embodiment shown in FIG. 11, and thus description thereof will be omitted.

Upon judgment in the step S13 that all file names of high-rank hit files have been selected, the processor 110 of the file server 100 notifies an end of the cache candidate management table update process to the search server 300 (S119). Then, the processor 110 of the file server 100 finishes the cache candidate management table update process.

The step S119 may be executed immediately after the search result list is received in the step S112.

According to the modified example of the embodiment, a cache hit rate can be increased even when the client machine 500 directly transmits the search request to the search server 300.

While the present invention has been described in detail and pictorially in the accompanying drawings, the present invention is not limited to such detail but covers various obvious modifications and equivalent arrangements, which fall within the purview of the appended claims.

What is claimed is:

1. A control computer coupled to a storage apparatus and a search computer, wherein the storage apparatus stores plurality of information resources, and wherein the search computer receives a search request containing a search condition and transmits information resource list information containing at least one piece of information regarding at least one information resource of the plurality of information resources as a search result, the at least one information resource corresponding to the search condition, the control computer comprising;
  a processor;
  a cache memory that stores the at least one information resource of the plurality of information resources; and
  a cache candidate management table that manages the plurality of information resources being considered as candidates for storage in the cache memory, and that stores an accumulated number and a date for each of the plurality of information resources being considered as candidates for storage in the cache memory,
  wherein the accumulated number indicates the number of times the information resource is ranked within a range including a highest search hit rank down to a predetermined lower limit search hit rank,
  wherein the date indicates a last date at which the information resource was determined to be ranked in the range including the highest search hit rank down to the predetermined lower limit search hit rank, and
  wherein the processor is operable to:
    receive the information resource list information from the search computer,
    wherein the information resource list information includes a plurality of search result lists, each search result list including names of the information resources high in relevance to the search condition and a search hit rank corresponding to each of the names, the search hit rank being an indicator of relevance to the search condition;
    extract, from each of the plurality of search result lists, the names of information resources having a search hit rank within the range including the highest search hit rank down to the predetermined lower limit search hit rank;
    calculate, for each information resource having the search hit rank within the range, the accumulated number that indicates the number of times the information resource is ranked within the range;
    create a prioritized list that includes the names of the information resources having the search hit rank within the range, and includes the accumulated number corresponding to each information resource, the names of the information resources being listed in a descending order from a highest accumulated number corresponding to each information resource;
    calculate, for each information resource having the search hit rank within the range, a cache priority, at least one factor being used for calculating the cache priority,
    wherein when the at least one factor for calculating the cache priority includes using the accumulated number corresponding to each information resource, the cache priority is set to correspond to the descending order from the highest accumulated number corresponding to each information resource, such that a highest cache priority is assigned to the information resource having the largest accumulated number;
    decide at least one information resource to be stored in the cache memory based on the calculated cache priority; and
    store the decided at least one information resource in the cache memory.

2. The control computer according to claim 1,
  wherein the control computer is further coupled to at least one client computer which accesses the information resource, and
  wherein the processor is further operable to:
    receive the search request from the client computer;
    transfer the received search request to the search computer; and
    transfer the received information resource list information to the client computer of a transmission source of the received search request.

3. The control computer according to claim 1,
  wherein the control computer is further coupled to at least one client computer which accesses the information resource and transmits the search request to the search computer, and
  wherein the processor is further operable to receive, from the search computer, the information resource list information transmitted as the search result from the search computer to the client computer.

4. The control computer according to claim 1,
  wherein when the at least one factor for calculating the cache priority includes using the date corresponding to the last date at which the information resource was determined to be ranked in the range including the highest search hit rank down to the predetermined lower limit search hit rank, the processor is further operable to:
    calculate, for each information resource, a passage of time from the last date at which the information resource was determined to be ranked in the range including the highest search hit rank down to the predetermined lower limit search hit rank to the current date,
    wherein the cache priority is set to correspond to the ascending order of the calculated passage of time corresponding to each information resource, such that a highest cache priority is assigned to the information resource having a shortest passage of time.

5. The control computer according to claim 1,
  wherein when the at least one factor for calculating the cache priority includes using the accumulated number corresponding to each information resource, and using the date corresponding to the last date at which the information resource was determined to be ranked in the range including the highest search hit rank down to the predetermined lower limit search hit rank, the processor is further operable to:
    calculate, for each information resource, a passage of time from the last date at which the information resource was determined to be ranked in the range including the highest search hit rank down to the predetermined lower limit search hit rank to the current date,
    wherein the cache priority is set to correspond to the descending order from the highest accumulated number corresponding to each information resource, such that a highest cache priority is assigned to the information resource having the largest accumulated number, and is set to correspond to the ascending order of the calculated passage of time corresponding to each information resource, such that a highest cache priority is assigned to the information resource having a shortest passage of time.

6. The control computer according to claim 1, further comprising:
  a file system providing data stored in the storage apparatus as files,
  wherein the information resource comprises the file provided by the file system or a directory containing at least one file.

7. A computer system, comprising:
  a control computer coupled to a storage apparatus that stores a plurality of information resources; and a search computer coupled to the control computer:
wherein the search computer is operable to:
- receive a search request containing a search condition;
- search at least one information resource corresponding to the search condition; and
- transmit information resource list information containing at least one piece of information regarding the searched at least one information resource of the plurality of information resources as a search result, wherein the control computer comprises a processor, a cache memory that stores the at least one information resource of the plurality of information resources, and a cache candidate management table that manages the plurality of information resources being considered as candidates for storage in the cache memory, and that stores an accumulated number and a date for each of the plurality of information resources being considered as candidates for storage in the cache memory, wherein the accumulated number indicates the number of times the information resource is ranked within a range including a highest search hit rank down to a predetermined lower limit search hit rank, wherein the date indicates a last date at which the information resource was determined to be ranked in the range including the highest search hit rank down to the predetermined lower limit search hit rank, wherein the processor is operable to:
- receive the information resource list information from the search computer,
- wherein the information resource list information includes a plurality of search result lists, each search result list including names of the information resources high in relevance to the search condition and a search hit rank corresponding to each of the names, the search hit rank being an indicator of relevance to the search condition;
- extract, from each of the plurality of search result lists, the names of information resources having a search hit rank within the range including the highest search hit rank down to the predetermined lower limit search hit rank;
- calculate, for each information resource having the search hit rank within the range, the accumulated number that indicates the number of times the information resource is ranked within the range;
- create a prioritized list that includes the names of the information resources having the search hit rank within the range, and includes the accumulated number corresponding to each information resource, the names of the information resources being listed in a descending order from a highest accumulated number corresponding to each information resource;
- calculate, for each information resource having the search hit rank within the range, a cache priority, at least one factor being used for calculating the cache priority,
- wherein when the at least one factor for calculating the cache priority includes using the accumulated number corresponding to each information resource, the cache priority is set to correspond to the descending order from the highest accumulated number corresponding to each information resource, such that a highest cache priority is assigned to the information resource having the largest accumulated number;
- decide at least one information resource to be stored in the cache memory based on the calculated cache priority; and
- store decided at least one information resource in the cache memory.

8. The computer system according to claim 7,
wherein the control computer is further coupled to at least one client computer which accesses the information resource, and
wherein the processor is further operable to:
- receive the search request from the client computer;
- transfer the received search request to the search computer; and
- transfer the received information resource list information to the client computer of a transmission source of the received search request.

9. The computer system according to claim 7,
wherein the control computer and the search computer are coupled to at least one client computer which accesses the information resource, and
wherein the search computer is further operable to:
- receive the search request from the client computer; and
- transmit the information resource list information containing the at least one piece of information regarding the searched information resource to the client computer and the control computer.

10. The computer system according to claim 7,
wherein when the at least one factor for calculating the cache priority includes using the date corresponding to the last date at which the information resource was determined to be ranked in the range including the highest search hit rank down to the predetermined lower limit search hit rank, the processor is further operable to:
- calculate, for each information resource, a passage of time from the last date at which the information resource was determined to be ranked in the range including the highest search hit rank down to the predetermined lower limit search hit rank to the current date,
- wherein the cache priority is set to correspond to the ascending order of the calculated passage of time corresponding to each information resource, such that a highest cache priority is assigned to the information resource having a shortest passage of time.

11. The computer system according to claim 7,
wherein when the at least one factor for calculating the cache priority includes using the accumulated number corresponding to each information resource, and using the date corresponding to the last date at which the information resource was determined to be ranked in the range including the highest search hit rank down to the predetermined lower limit search hit rank, the processor is further operable to:
- calculate, for each information resource, a passage of time from the last date at which the information resource was determined to be ranked in the range including the highest search hit rank down to the predetermined lower limit search hit rank to the current date,
- wherein the cache priority is set to correspond to the descending order from the highest accumulated number corresponding to each information resource, such that a highest cache priority is assigned to the information resource having the largest accumulated number, and is set to correspond to the ascending order of the calculated passage of time corresponding to each information resource, such that a highest cache priority is assigned to the information resource having a shortest passage of time.

12. The computer system according to claim 7,
wherein the control computer further comprises a file system providing data stored in the storage apparatus as files, and
wherein the information resource comprises the file provided by the file system or a directory containing at least one file.

13. An access control method for a control computer, which is coupled to a storage apparatus and a search computer, wherein the storage apparatus stores a plurality of information resources, and wherein the search computer receives a search request containing a search condition and transmits information resource list information containing at least one piece of information regarding at least one information resource of the plurality of information resources as a search result, the at least one information resource corresponding to the search condition, the control computer comprising a processor, a cache memory that stores the at least one information resource of the plurality of information resources, and a cache management table, the method comprising the steps of:

managing, by the cache candidate management table, the plurality of information resources being considered as candidates for storage in the cache memory, and that stores an accumulated number and a date for each of the plurality of information resources being considered as candidates for storage in the cache memory, wherein the accumulated number indicates the number of times the information resource is ranked within a range including a highest search hit rank down to a predetermined lower limit search hit rank, and wherein the date indicates a last date at which the information resource was determined to be ranked in the range including the highest search hit rank down to the predetermined lower limit search hit rank;

receiving the information resource list information from the search computer, wherein the information resource list information includes a plurality of search result lists, each search result list including names of the information resources high in relevance to the search condition and a search hit rank corresponding to each of the names, the search hit rank being an indicator of relevance to the search condition;

extracting, from each of the plurality of search result lists, the names of information resources having a search hit rank within the range including the highest search hit rank down to the predetermined lower limit search hit rank;

calculating, for each information resource having the search hit rank within the range, the accumulated number that indicates the number of times the information resource is ranked within the range;

creating a prioritized list that includes the names of the information resources having the search hit rank within the range, and includes the accumulated number corresponding to each information resource, the names of the information resources being listed in a descending order from a highest accumulated number corresponding to each information resource;

calculating, for each information resource having the search hit rank within the range, a cache priority, at least one factor being used for calculating the cache priority, wherein when the at least one factor for calculating the cache priority includes using the accumulated number corresponding to each information resource, the cache priority is set to correspond to the descending order from the highest accumulated number corresponding to each information resource, such that a highest cache priority is assigned to the information resource having the largest accumulated number;

deciding at least one information resource to be stored in the cache memory based on the calculated cache priority; and storing the decided at least information resource in the cache memory.

14. The access control method according to claim 3,
wherein the control computer is coupled to at least one client computer which accesses the information resource, and
wherein the access control method further comprises the steps of:
receiving the search request from the client computer;
transferring the received search request to the search computer; and
transferring the received information resource list information to the client computer of a transmission source of the received search request.

15. The access control method according to claim 13,
wherein the control computer is further coupled to at least one client computer which accesses the information resource and transmits the search request to the search computer, and
wherein the step of receiving the information resource list information comprises receiving, from the search computer, the information resource list information transmitted as the search result from the search computer to the client computer.

16. The control computer according to claim 5, wherein the cache priority is calculated using the equation:

$$P=f(a)/g(B),$$

wherein P indicates the cache priority, A indicates the accumulated number, and B indicates the passage of time from the last date at which the information resource was determined to be ranked in the range including the highest search hit rank down to the predetermined lower limit search hit rank to the current date.

17. The computer system according to claim 11, wherein the cache priority is calculated using the equation:

$$P=f(a)/g(B),$$

wherein P indicates the cache priority, A indicates the accumulated number, and B indicates the passage of time from the last date at which the information resource was determined to be ranked in the range including the highest search hit rank down to the predetermined lower limit search hit rank to the current date.

18. The access control method according to claim 13,
wherein when the at least one factor for calculating the cache priority includes using the accumulated number corresponding to each information resource, and using the date corresponding to the last date at which the information resource was determined to be ranked in the range including the highest search hit rank down to the predetermined lower limit search hit rank, the processor is further operable to:
calculate, for each information resource, a passage of time from the last date at which the information resource was determined to be ranked in the range including the highest search hit rank down to the predetermined lower limit search hit rank to the current date, wherein the cache priority is set to correspond to the descending order from the highest accumulated number corresponding to each information resource, such that a highest cache priority is assigned to the information resource having the largest accumulated number, and is set to correspond to the ascending order of the calculated passage of time corresponding to each information resource, such that a highest cache priority is assigned to the information resource having a shortest passage of time.

19. The access control method according to claim 18, wherein the cache priority is calculated using the equation:

$$P=f(a)/g(B),$$

wherein P indicates the cache priority, A indicates the accumulated number, and B indicates the passage of time from the last date at which the information resource was determined to be ranked in the range including the highest search hit rank down to the predetermined lower limit search hit rank to the current date.

* * * * *